United States Patent [19]

Schmitt

[11] 4,226,260
[45] Oct. 7, 1980

[54] SINGLE LEVER FAUCET PLASTIC CARTRIDGE VALVE

[75] Inventor: William C. Schmitt, Wauwatosa, Wis.

[73] Assignee: Milwaukee Faucets, Inc., Milwaukee, Wis.

[21] Appl. No.: 70,557

[22] Filed: Aug. 29, 1979

[51] Int. Cl.³ .............................................. F16K 43/00
[52] U.S. Cl. .................................. 137/315; 137/454.6; 137/625.17
[58] Field of Search ................ 137/315, 454.6, 625.17, 137/636.2

[56] References Cited

U.S. PATENT DOCUMENTS

| | | | |
|---|---|---|---|
| 3,536,101 | 11/1968 | Bosworth | 137/315 |
| 3,543,799 | 12/1970 | Hayman | 137/625.17 |
| 3,958,601 | 5/1976 | Schmitt | 137/636.2 |
| 4,064,900 | 12/1977 | Schmitt | 137/315 |

Primary Examiner—Harold W. Weakley
Attorney, Agent, or Firm—Arnstein, Gluck, Weitzenfeld & Minow

[57] ABSTRACT

A single lever faucet mixing valve comprises a unitary cartridge which may be installed in a faucet housing for original installation and removed and replaced when worn out. The cartridge is formed of a plurality of molded plastic parts which are adapted to be snapped into assembled relation to form a unitary construction.

10 Claims, 10 Drawing Figures

U.S. Patent  Oct. 7, 1980  Sheet 1 of 4  4,226,260
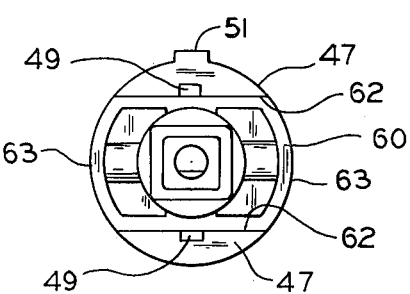
FIG.2
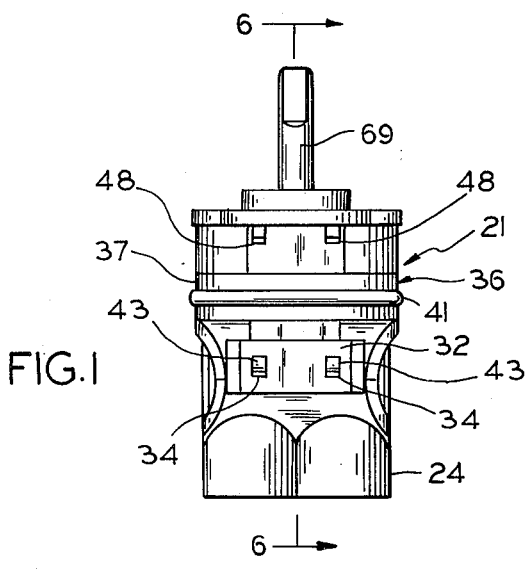
FIG.1
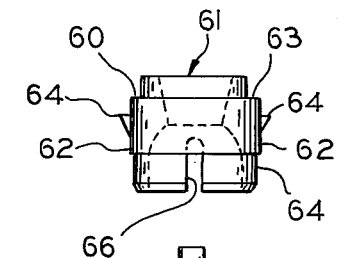
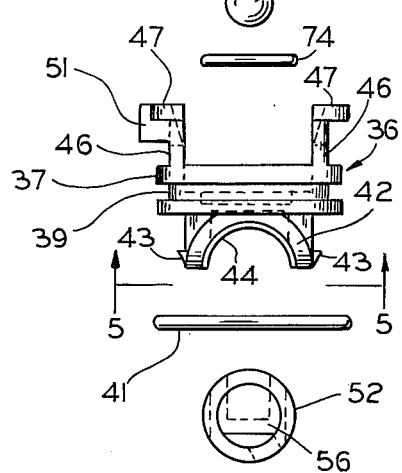
FIG.4
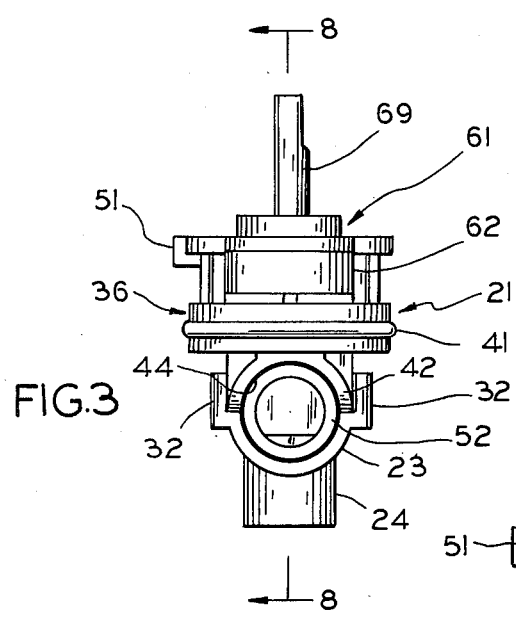
FIG.3
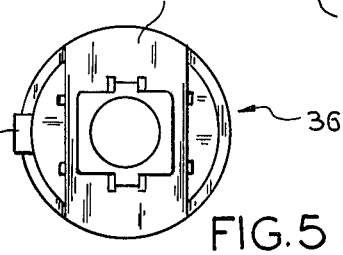
FIG.5

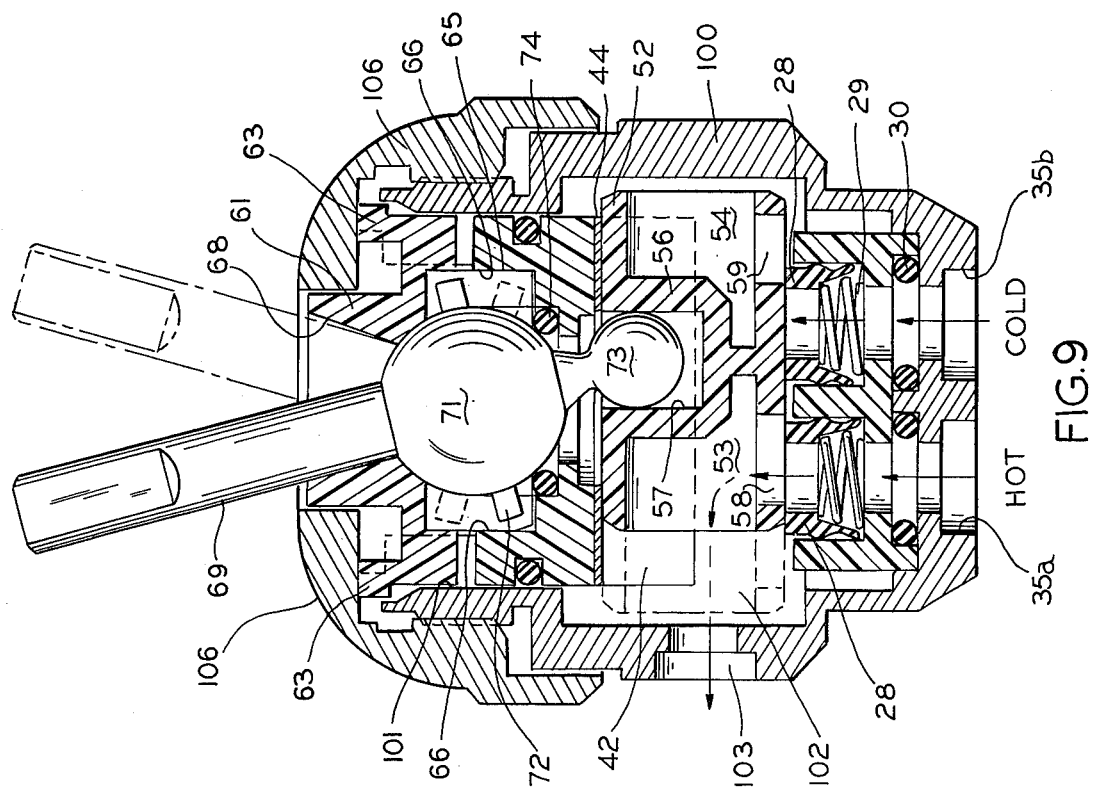
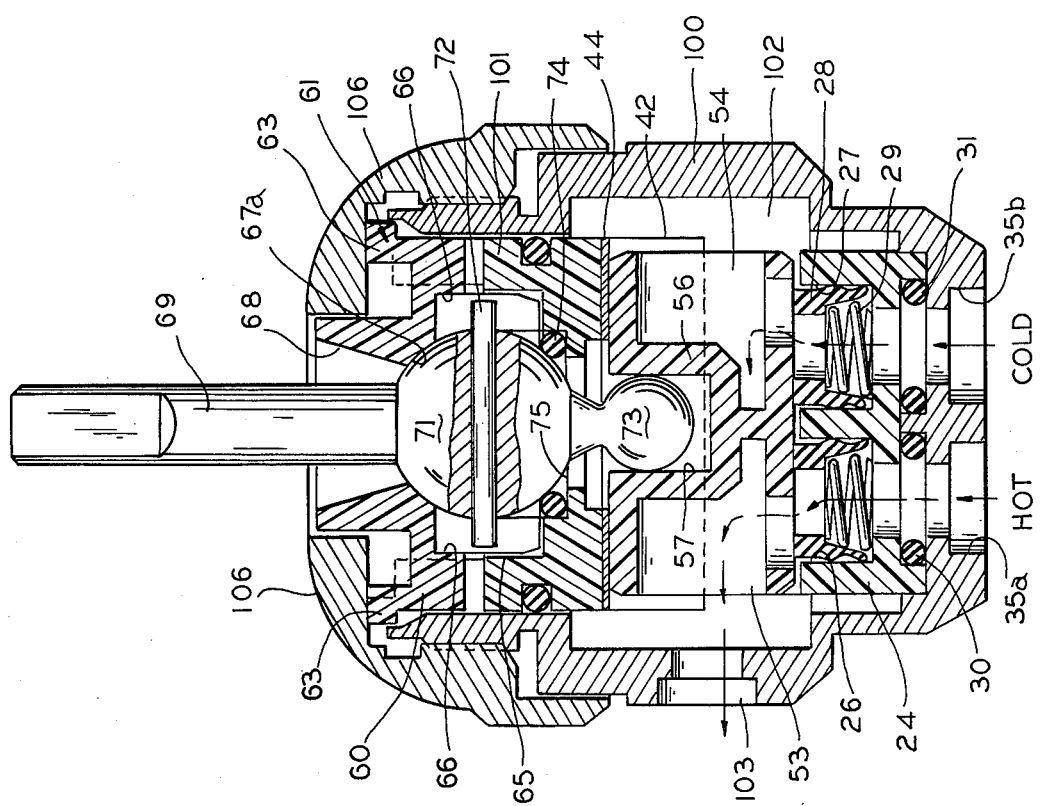

SINGLE LEVER FAUCET PLASTIC CARTRIDGE VALVE

BRIEF SUMMARY OF THE INVENTION

The present invention relates to a single lever faucet mixing valve comprising a unitary cartridge readily installable in and removable from a housing. The cartridge comprises a plurality of molded plastic parts adapted to be snapped into assembled relation to form a unitary construction. Included in the assembly are components constituting a valve body having a cylindrical cavity and a valve plug slidably and rotatably disposed in the cavity. The cavity has inlet ports communicating with hot and cold water supply lines and the plug has radial ports registrable with respective inlet ports.

For a ready understanding of the principle of the invention, a single embodiment applied to a lavatory faucet valve, but to which the application is not restricted, is shown in the accompanying drawings.

BRIEF DESCRIPTION OF THE DRAWINGS

FIG. 1 is a front elevational view of a cartridge in accordance with the present invention, in assembled relation.

FIG. 2 is a top plan view thereof.

FIG. 3 is a side elevational view of the cartridge rotated 90° from the position shown in FIG. 1.

FIG. 4 is an exploded view of the cartridge of FIG. 1.

FIG. 5 is a bottom plan view looking in the direction of the arrows 5—5 of FIG. 4.

FIG. 8 is a cross sectional view, on an enlarged scale, taken substantially on line 8—8 of FIG. 3.

FIG. 9 is a view similar to FIG. 7, showing the components in another position of operation.

BRIEF DESCRIPTION OF A PREFERRED EMBODIMENT

Figure 10:
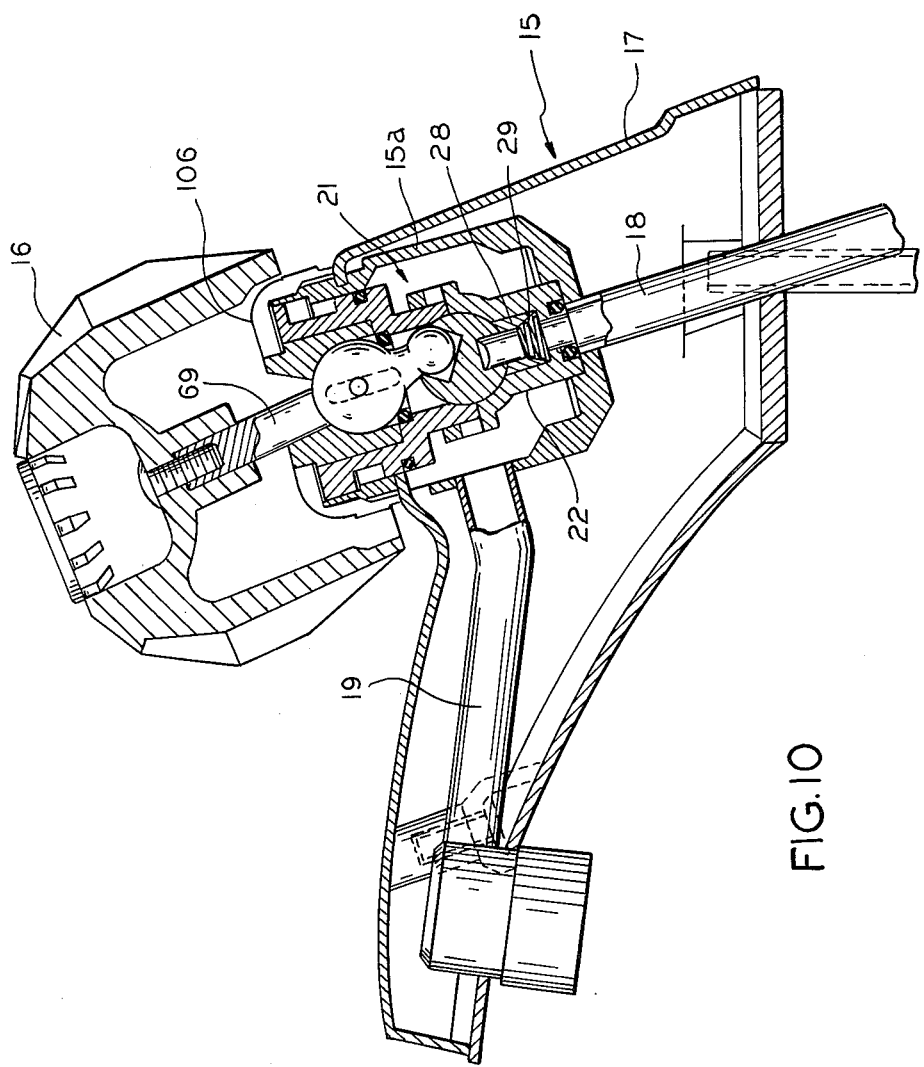
FIG. 10 is a vertical cross sectional view of a lavatory faucet showing the present invention incorporated therein.

Referring to FIG. 10, the present invention is shown embodied in a hot and cold water mixing faucet 15 operable through a single control handle 16, although it will be understood that this is merely by way of illustration rather than limitation and it will be apparent that the invention may be readily adapted for other uses. The faucet 15 includes sleeve 15a contained in a housing member 17 which is suitably mounted on a lavatory stand or sink in fixed relation to plumbing connections, such as water supply pipes 18. The faucet includes a spout 19 and both the spout 19 and water supply lines 18 communicate with the cartridge, indicated generally by the numeral 21, presently to be described. The cartridge 21 is molded from a suitable plastic material which is rigid, non-deformable and resistant to both hot and cold water, such as Laxan or Celcon. Further, the component parts of the cartridge are designed so as to be snapped into assembled relation without the use of any tools.

Referring to FIGS. 1–9, the cartridge 21 comprises a carrier component 22 having a hemi-cylindrical portion 23 from which depends a pair of cylindrical sections 24, each of which is counterbored to provide respective passages 26,27 in each of which is received an inlet seal 28 and a compression spring 29. The lower portions of the passages 26,27 are counterbored to receive O-rings 30,31 disposed concentrically with openings 35 and 35b in sleeve 15a. Said openings receive inlet pipes 18 connected to respective supplies of hot or cold water, as the case may be. Extending upwardly from opposite sides of the hemi-cylindrical portion 23 are a pair of wings 32 which are offset from respective sides to provide shoulders 33. Each of the wings 32 is provided with a pair of spaced openings 34, preferably rectangular, for a purpose as will be hereinafter explained.

A cooperating sealing component 36 includes an intermediate cylindrical body portion 37 having a counterbored axial through passage 38 and an outer circumferentially extending groove 39 adapted to receive an O-ring 41. A hemi-cylindrical portion 42 depends from the body portion 37 and is provided on each side thereof with a pair of barbs 43 spaced to register and cooperate with the openings 34 of the carrier component 22. The hemi-cylindrical surface of the portion 42 is provided with an arcuate metal bearing plate 44, preferably formed of stainless sheet steel. The plate 44 is shaped substantially as illustrated in FIGS. 4 and 5 and conforms closely to the contour of the hemi-cylindrical surface of portion 42.

The outside diametral dimension of the hemi-cylindrical portion 42 is such that when in assembled relation with the carrier component 21 it will fit snugly between the wings 32 of the carrier component 21, with the lower edges abutting respective shoulders 33 and with the barbs engaged 43 in respective openings 34.

The upper portion of the sealing component 36 includes a pair of upwardly extending spaced wings 46, each topped by an arcuate flange 47 and each wing having a pair of spaced rectangular openings 48. Each of the wings 46 has a bevelled recess 49 on its inner surface and one of the wings is provided with a lateral protuberance 51 constituting a key adapted to be received in a key way provided in the sleeve 15a, hereinafter to be described.

A generally cylindrical valve plug 52 is received in the cylindrical chamber formed by the assembly of the carrier and sealing components 22 and 36, respectively. The valve plug 52 includes a pair of co-axial chambers 53 and 54, one at each end of the plug, the chambers being separated by a median wall portion 56 shaped substantially as shown in FIGS. 8 and 9 and being open at their outer ends. The wall portion 56 is provided with a cylindrical cavity 57. The lower peripheral wall portions of the chambers 53,54 are provided with passages 58 and 59 respectively, which are adapted to register with openings 26 and 27 respectively, in the carrier component 24. The inlet seals 28 received in each of the passages 26 and 27 are biased into engagement with the peripheral surface of the valve plug 52 by springs 29 to effect a water-tight seal therewith.

A retaining component 61 which is received in the space between the wings 46 of the sealing member includes a body portion 60 having two parallel flat sides 62 and arcuate ends 63. Each of the flat sides has a pair of barbs 64 which are spaced so as to register with the openings 48 of sealing component 36 and to be engaged therein. The body portion 60 includes a depending cylindrical wall 65 which is provided with vertical slots 66 at two opposed diametral points. Disposed centrally of the body portion 60 is a downwardly opening cavity 67 having an upper hemi-spherical surface 67a and a lower cylindrical surface 67b which is substantially tangent to the upper surface 67a. Communicating with the cavity 67 is a well 68 having flared interior wall surfaces. A lever 69 formed of brass or any suitable metal in the form of a cylindrical stem is provided with an intermediate ball 71 having a transverse pin 72, the ends of which extend beyond the periphery of the ball. The size of the ball 71 is such as to fit snugly within the cavity 67, with the upper portion of the ball surface engaging the spherical surface 67a of the cavity. Preferably, the internal diameter of the cylindrical surface 67b is such as to provide a friction fit with the ball 71 which permits movement of the lever 69 to a variety of positions but which retains the lever in a position of adjustment. The provision of the slots 66 in the cylindrical wall 64 permits opposite portions of the wall to yield to accommodate a slightly oversize ball. Depending from the intermediate ball 71 is a lower ball 73 which is adapted to be received in the cavity 57 of the valve plug 52.

Figure 7:
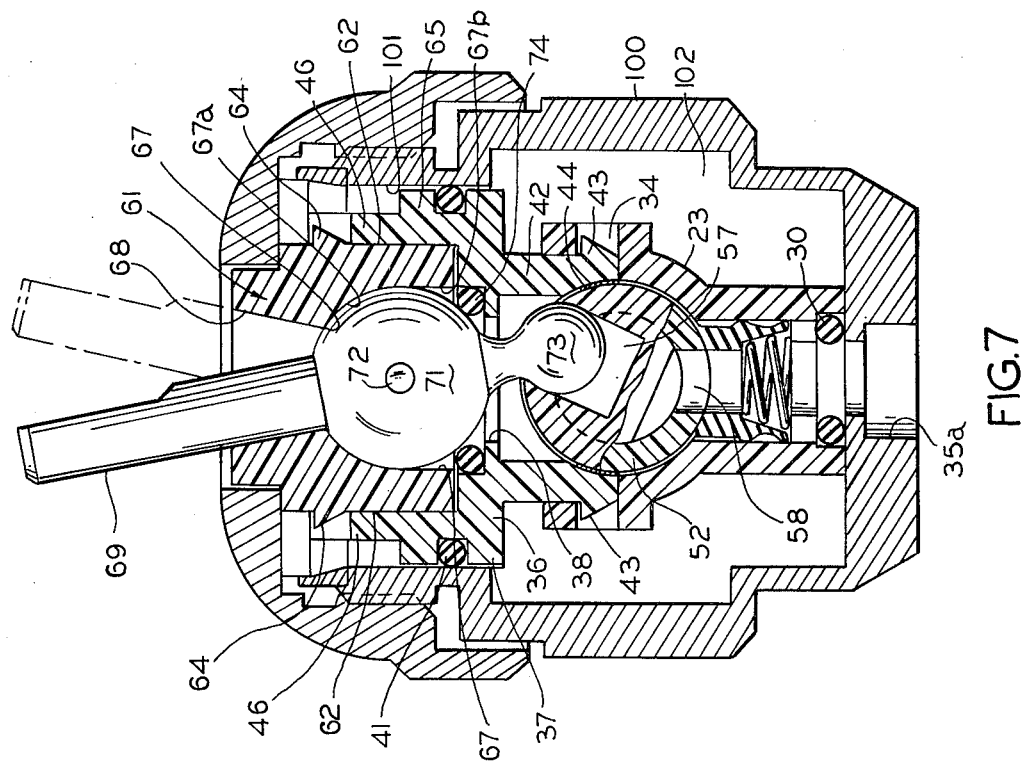
FIG. 7 is a view similar to FIG. 6 but showing the cartridge components in closed or shut-off position.
Figure 6:
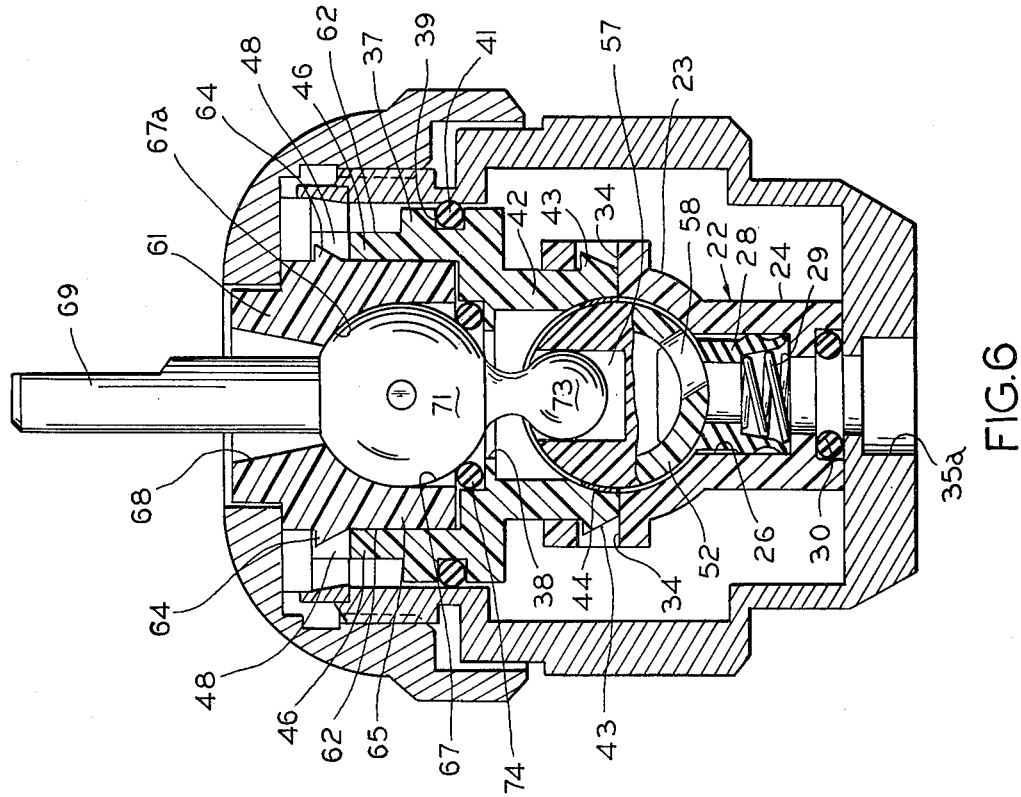
FIG. 6 is a cross sectional view, on an enlarged scale, taken substantially on line 6—6 of FIG. 1 and showing the cartridge components in one position of operation.

The cartridge 21 is assembled by first inserting the springs 29 and inlet seals 28 into the passages 26,27 of the carrier component 22, after which the valve plug 52 with the cavity 57 uppermost is laid into the hemi-cylindrical portion 23 in engagement with the inlet seals 28. The lower portion of the sealing component 36 then is inserted into the space between the wings 32 so as to engage the barbs 43 in the openings 34 and effect interlocking of the two parts, as shown in FIGS. 6 and 7. The valve plug 52 now is confined between the inlet seals 28 and the bearing plate 44 and is biased by the springs 29 in the direction of the bearing plate 44. Accordingly, there is sufficient frictional resistance to movement of the valve plug 52 which insures that the valve plug 52 will maintain a position of adjustment until manually changed. The stem 69 then is inserted in the retaining component 61, to engage the ball 71 with the spherical surface 67a of the cavity and to pass the ends of pin 72 into the slots 66. An O-ring 74 is laid on the annular shoulder 75 in the sealing component 36, with the stem 69 disposed coaxially of the body of the retaining component 61, so that the lower ball 73 is in registration with the cavity 57 of the valve plug 52, and the retaining component 61 is manually urged into the space between the wings 46 of the sealing component 36 to the point where the ball 71 engages the O-ring 74 and the barbs 64 engage in the openings 48 of the sealing component. This completes the assembly of the cartridge which may be used in a variety of styles and types of faucets, one example being illustrated in FIG. 10. The cartridge 21 is intended to be inserted in a sleeve 100 which may be identical to the sleeve 15a (FIG. 10) or slightly modified for adaptation to a particular style or type of faucet. As shown in FIGS. 6-9, the sleeve 100 is generally cylindrical in form and includes an upper chamber portion 101 in which the cylindrical body portion 37 of the sealing component 36 is received and sealed therein by the O-ring 41. The lower chamber portion of the sleeve 100 has an enlarged internal diameter which provides an annular passage 102 surrounding the valve plug 52. The wall of the sleeve 100 is provided with an opening 103 in registry with the passage 102, the opening being adapted to receive a discharge spout, not shown. The sleeve 100 is closed at the bottom except for counterbored apertures 35a and 35b in which are received hot and cold water supply lines 18, the lines being secured in the apertures as by braising or soldering. The upper edge of the sleeve 100 is provided with a notch 110 to receive the protuberance 51 of the cartridge. This locks the cartridge 21 against rotation relative to the sleeve 100. The uppermost portion of the sleeve 100 is threaded on its peripheral surface to receive a threaded head 106 which engages the retaining component 61 and retains the cartridge 21 in assembled relation with the sleeve.

Control of the valve is effected by swinging the lever 69 in different directions. For example, as shown in FIG. 9, swinging of the lever 69 parallel to the plane of the slots 66 causes the valve plug 52 to shift axially thereof so as to effect selective registry of the openings 58 and 59 with passages 26 and 27, respectively. As shown in FIG. 9, with lever 69 in the solid line position, the valve plug 52 is disposed at the extreme right whereby passage 27 is closed and passage 26 is open so that hot water may flow through the passage 58, through chamber 53, through the annular passage 102 and through the outlet passage 103. When the lever 69 is rocked in a direction opposite to the broken line position shown in FIG. 9, passage 59 is in registry with passage 27 so that cold water may flow into chamber 54, annular passage 102 and out through passage 103. At an intermediate position of the lever 69, as shown in FIG. 8, both passages 58 and 59 may be partially opened in different proportions to effect a mixing of the hot and cold water.

Also, as shown in FIGS. 6 and 7, the lever 69 may be swung in directions transverse to the plane of the slot 66 about the axis of the pins 72. Such movement effects rocking of the valve plug 52 about its own axis to effect registry, partial registry or non-registry of the passages 58 and 59 with respective passages 26 and 27 to selectively control the quantity and discharge of the hot and cold water.

In the event of leakage, by removing the head 106, the cartridge 21 is readily accessible for removal and replacement either of the O-rings, or the entire cartridge.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A cartridge valve comprising a carrier component having a body portion having a first horizontal hemi-cylindrical cavity and a first pair of spaced wing portions, each extending upwardly adjacent a respective side of said cavity,
   hot and cold water inlet passages in the lower end of said carrier component communicating with said first cavity,
   a sealing component having a vertical through passage, a lower body portion having a second horizontal hemi-spherical cavity and a second pair of upwardly extending spaced parallel wing portions, said lower body portion having parallel sides spaced so as to be snugly received between said first pair of wing portions,
   first inter-engaging means associated with said first pair of wing portions and said lower body portion for securing said carrier and sealing components in assembled relation thereby forming a horizontal substantially cylindrical chamber, a cylindrical valve plug slideably and rotatably received in said cylindrical chamber, said valve plug having a pair of separated co-axial chambers each open at its outer end and each provided with an opening alignable with a respective water inlet passage, said valve plug having an open recess substantially opposite said last mentioned openings, a retaining component having parallel sides and a hemi-spherical cavity and adapted to be received between said second pair of wing portions, second inter-engaging means associated with said second pair of wing portions and the parallel sides of said retaining component for securing said sealing and retaining components in assembled relation, a lever having an upper and lower ball with the upper ball being received in said hemi-spherical cavity and the lower ball being received in the open recess of said valve plug, said plug being movable by movement of said lever so as to effect alignment or non-alignment of the water inlet passages with the valve plug openings.

2. The combination as defined in claim 1 in which each of the first pair of spaced wing portions is outwardly offset from the the hemi-cylindrical cavity of the carrier component thereby to form a pair of longitudinally extending shoulders.

3. The combination as defined in claim 1 including sealing means in said water inlet passages and in engagement with said valve plug so as to provide a seal therebetween.

4. A cartridge valve comprising a carrier component having a body portion having a first horizontal hemi-cylindrical cavity and a first pair of spaced wing portions, each extending upwardly adjacent a respective side of said cavity, hot and cold water inlet passages in the lower end of said carrier component communicating with said first cavity, a sealing component having a vertical through passage, a lower body portion having a second horizontal hemi-spherical cavity and a second pair of upwardly extending spaced parallel wing portions, said lower body portion having parallel sides spaced so as to be snugly received between said first pair of wing portions, first inter-engaging means associated with said first pair of wing portions and said lower body portion for securing said carrier and sealing components in assembled relation thereby forming a horizontal substantially cylindrical chamber, a cylindrical valve plug slideably and rotatably received in said cylindrical chamber, said valve plug having a pair of separated co-axial chambers each open at its outer end and each provided with an opening alignable with a respective water inlet passage, said valve plug having an open recess substantially opposite said last mentioned openings, a retaining component having parallel sides and adapted to be received between said second pair of wing portions, second inter-engaging means associated with said second pair of wing portions and the parallel sides of said retaining component for securing said sealing and retaining components in assembled relation, a lever having a lower ball received in said recess, means journalling said lever for swinging movement in said retaining component whereby selective swinging of said lever effects movement of said valve plug axially and angularly to effect alignment or non-alignment of the water inlet passages with the valve plug openings.

5. The combination as defined in claim 1 in which the retaining component includes a pair of opposed slots and the upper ball includes co-axially aligned pins received in said slots for guiding the lever in its movement.

6. The combination as defined in claim 1 including a bearing plate interposed between said valve plug and the hemi-spherical cavity of said sealing component.

7. The combination as defined in claim 1 in which each of the components is formed of molded plastic material.

8. The combination as defined in claim 3 in which each of the sealing means is yieldingly urged into engagement with the valve plug.

9. The combination as defined in claim 1 in which the retaining component includes a well having angularly related sides providing abutments for limiting the movement of the lever.

10. A cartridge valve comprising a carrier component, a sealing component, a retaining component, a cylindrical valve plug, and a lever connected to said plug, said carrier and sealing components having complementary hemi-spherical cavities and cooperating snap interlocking means to secure said carrier and sealing components in assembled relation and form a cylindrical chamber in which is received the valve plug, said retaining and sealing components having cooperating snap interlocking means to secure said retaining and sealing components in assembled relation, means in said retaining component for journalling said lever for swinging movement so as to move said valve plug axially and angularly, said carrier component having hot and cold water inlet passages and said valve plug having spaced openings adapted to be selectively moved into registry with said inlet openings by the movement of said lever.

* * * * *